(12) United States Patent
Andersen et al.

(10) Patent No.: US 12,392,192 B2
(45) Date of Patent: Aug. 19, 2025

(54) VACUUM INSULATED GLASS UNIT WITH GETTER, AND METHOD OF ACTIVATING A GETTER IN VACUUM INSULATED GLASS UNIT

(71) Applicant: VKR HOLDING A/S, Hørsholm (DK)

(72) Inventors: Søren Vejling Andersen, Hørsholm (DK); Thibault De Rycke, Hørsholm (DK); Simon Johnsen, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 657 days.

(21) Appl. No.: 17/524,937

(22) Filed: Nov. 12, 2021

(65) Prior Publication Data

US 2022/0074258 A1   Mar. 10, 2022

Related U.S. Application Data

(63) Continuation of application No. PCT/EP2020/067270, filed on Jun. 22, 2020.

(51) Int. Cl.
 *E06B 3/67* (2006.01)
 *B41M 5/24* (2006.01)
 (Continued)

(52) U.S. Cl.
 CPC ............. *E06B 3/6612* (2013.01); *B41M 5/24* (2013.01); *E06B 3/66304* (2013.01);
 (Continued)

(58) Field of Classification Search
 CPC ........ E06B 3/66; E06B 3/6608; E06B 3/6612; E06B 3/6617; E06B 3/663–66371;
 (Continued)

(56) References Cited

U.S. PATENT DOCUMENTS 6,420,002 B1 * 7/2002 Aggas ................. E06B 3/66304
  52/786.13
6,559,596 B1 * 5/2003 Arai ....................... H01J 7/186
  313/553
(Continued)

FOREIGN PATENT DOCUMENTS

CN    102557411 A    7/2012
CN    206607171 A    11/2017
(Continued)

OTHER PUBLICATIONS

International Search Report for corresponding application PCT/EP2020/067270 filed Jun. 22, 2020; Mail date Dec. 4, 2020.
(Continued)

*Primary Examiner* — Z. Jim Yang
(74) *Attorney, Agent, or Firm* — CANTOR COLBURN LLP

(57) ABSTRACT

A vacuum insulated glazing unit including a first glass pane and a second glass pane with inner surfaces opposing each other, a side seal material positioned between edges of the glass panes thereby forming a sealed cavity having a cavity pressure between the first glass pane and the second glass pane, a number of spacers positioned between the first glass pane and the second glass pane inside the sealed cavity, and at least one getter positioned inside the sealed cavity with a surface having an uneven surface structure, the uneven surface structure having a plurality of depressions, where each pair of two consecutive depressions are spaced apart with a depression distance being at the most 25 μm.

18 Claims, 11 Drawing Sheets

(51) Int. Cl.
*E06B 3/66* (2006.01)
*E06B 3/663* (2006.01)
*E06B 3/673* (2006.01)
*E06B 3/677* (2006.01)

(52) U.S. Cl.
CPC ...... *E06B 3/67326* (2013.01); *E06B 3/67339* (2013.01); *E06B 3/6775* (2013.01); *Y02A 30/249* (2018.01); *Y02B 80/22* (2013.01)

(58) Field of Classification Search
CPC ............ E06B 2003/6638; Y02B 80/22; Y02A 30/249; Y10T 428/24355; Y10T 428/24364; Y10T 428/24446; Y10T 428/24372; Y10T 428/2438; Y10T 428/24413; Y10T 428/12993; H10K 50/844; H10K 50/8445; H10K 50/846; H01L 23/26; H01L 23/28
See application file for complete search history.

(56) References Cited

U.S. PATENT DOCUMENTS

| | | | | |
|---|---|---|---|---|
| 2002/0050785 | A1* | 5/2002 | Nakada | H10K 50/846 313/553 |
| 2004/0253395 | A1 | 12/2004 | Amari | |
| 2006/0083896 | A1* | 4/2006 | McKinnell | H01L 23/26 257/E23.137 |
| 2007/0046198 | A1* | 3/2007 | Kuan | H10K 50/846 313/512 |
| 2009/0261464 | A1* | 10/2009 | Alie | H01L 23/26 257/E23.18 |
| 2011/0287214 | A1* | 11/2011 | Reinert | B81C 1/00206 29/832 |
| 2013/0321903 | A1 | 12/2013 | Grzybowski | |
| 2013/0340612 | A1* | 12/2013 | Ackley | B01J 20/28011 502/79 |
| 2014/0034218 | A1* | 2/2014 | Hogan | B32B 3/18 156/109 |
| 2014/0037869 | A1* | 2/2014 | Petrmichl | E06B 3/663 428/34 |
| 2014/0175590 | A1* | 6/2014 | Gooch | B81B 7/0038 428/161 |
| 2014/0272208 | A1 | 9/2014 | Song | |
| 2015/0102432 | A1* | 4/2015 | Hsieh | B81B 7/0025 257/415 |
| 2015/0156890 | A1* | 6/2015 | Giroud | H01L 23/3121 216/17 |
| 2015/0249042 | A1* | 9/2015 | Gooch | B32B 15/04 428/195.1 |
| 2016/0031706 | A1* | 2/2016 | Zheng | B81B 7/0038 438/115 |
| 2017/0002603 | A1* | 1/2017 | Veerasamy | C03C 17/3636 |
| 2017/0081176 | A1* | 3/2017 | Ji | B81B 7/0038 |
| 2017/0222185 | A1* | 8/2017 | Matsunaga | C23C 14/042 |
| 2017/0288171 | A1* | 10/2017 | Ito | H10K 71/00 |
| 2017/0360221 | A1* | 12/2017 | Artwohl | A47F 3/0434 |
| 2019/0348247 | A1* | 11/2019 | Chuntonov | E06B 3/677 |
| 2020/0123040 | A1* | 4/2020 | Lian | E06B 3/6775 |

FOREIGN PATENT DOCUMENTS

| | | |
|---|---|---|
| EP | 1439152 A1 | 7/2004 |
| EP | 3170800 A1 | 5/2017 |
| KR | 102005045888 A | 5/2005 |
| KR | 20140070976 A | 6/2014 |
| KR | 20180001362 A * | 1/2018 |
| WO | 9102878 A1 | 3/1991 |
| WO | 0112942 A1 | 2/2001 |
| WO | 2014022109 A1 | 2/2014 |
| WO | 2014022118 A1 | 2/2014 |
| WO | 2016191542 A1 | 12/2016 |

OTHER PUBLICATIONS

Written Opinion of the International Searching Authority for corresponding application PCT/EP2020/067270 filed Jun. 22, 2020; Mail date Dec. 4, 2020.
European Search Report for corresponding application EP 25 15 0311; Report dated Apr. 16, 2025.

* cited by examiner

VACUUM INSULATED GLASS UNIT WITH GETTER, AND METHOD OF ACTIVATING A GETTER IN VACUUM INSULATED GLASS UNIT

CROSS REFERENCE TO RELATED APPLICATIONS

This application is a continuation of International Patent Application Number PCT/EP2020/067270 filed on Jun. 22, 2020, which claimed priority to Danish Patent Application Number PA201970399 filed on Jun. 25, 2019 and to Danish Patent Application Number PA201970400 filed on Jun. 25, 2019, all of which said applications are herein incorporated by reference in their entirety.

TECHNICAL FIELD

The disclosure relates to a vacuum insulated glazing unit comprising at least one getter positioned inside the sealed cavity and a method of activating the getter.

BACKGROUND

Vacuum insulated glass (VIG) units typically include two or more glass panes, spaced by an array of support structures e.g. spacers or pillars distributed between the glass panes. The glass panes are sealed with a side sealing at the periphery to provide an evacuated space (i.e., vacuum) located between the glass panes. The evacuated space is sealed at a reduced pressure such as 0.001 millibars or less in order to ensure an insulating effect of the VIG unit. The overall construction provides improved thermal and noise insulating properties compared to ordinary glass windows. The side sealing at the periphery of the glass sheets accordingly needs to be tight in order to provide that the desired internal pressure in the void can be maintained for several years. To prevent sagging and contact between adjacent glass panes, the support structures e.g. pillars can serve as discrete spacers between adjacent glass panes.

During the lifetime of a VIG unit, the inner surfaces of the glass panes may release absorbed gases, whereby the pressure inside the VIG unit is increases. This results in a reduction of the thermal insulating properties. To prevent this from happening, a getter is normally positioned inside the VIG unit. A getter is a reactive material has the purpose of completing and maintaining the vacuum. When gas molecules strike the getter material, they combine with it chemically or by absorption, thereby effectively removing the residual gas as it is produced. Thus, the getter removes small amounts of gas from the evacuated space thereby reducing the pressure and increasing the vacuum, while maintaining the thermal insulating properties of the VIG unit.

Traditionally, the getter is activated by means of induction heating during production of the VIG unit, e.g. before, during or after the cavity is sealed and evacuated.

BRIEF SUMMARY

Disclosed herein in a first aspect is a vacuum insulated glazing unit comprising:
- a first glass pane and a second glass pane with inner surfaces opposing each other;
- a side seal material positioned between edges of the glass panes thereby forming a sealed cavity having a cavity pressure between the first glass pane and the second glass pane;
- a number of spacers positioned between the first glass pane and the second glass pane inside the sealed cavity; and
- at least one getter positioned inside the sealed cavity.

The getter may have a surface having an uneven surface structure, the uneven surface structure comprising a plurality of depressions, wherein each pair of two consecutive depressions are spaced apart with a depression distance being at the most 25 µm.

By uneven surface structure is meant a micro-scaled fractured surface, which may appear smooth to the naked eye.

By the multiple of micro-scaled depressions in the getter surface, a very large getter surface area is obtained. This ensures an optimum function of the getter in turn prolonging the lifetime of the vacuum insulated glazing unit (VIG unit) by maintaining and possibly even reducing the pressure inside the VIG unit over time.

Disclosed in a second aspect is a vacuum insulated glazing unit comprising:
- a first glass pane and a second glass pane with inner surfaces opposing each other;
- a side seal material positioned between edges of the glass panes thereby forming a sealed cavity having a cavity pressure between the first glass pane and the second glass pane;
- a number of spacers positioned between the first glass pane and the second glass pane inside the sealed cavity; and
- at least one getter positioned inside the sealed cavity.

The getter may be fixed inside the sealed cavity by at least one getter fixation member positioned on a surface of the getter and pressing against at least one of the inner surface.

By using one or more spacers for fixing the getter inside the VIG unit, the getter does not move. Thus, there is no need for glass drilling for creating a recess in the glass pane inside which a getter pill is held. Also, no glue for fixing the getter to the first pane is needed.

Disclosed herein in a third aspect is a vacuum insulated glazing unit comprising:
- a first glass pane and a second glass pane with inner surfaces opposing each other;
- a side seal material positioned between edges of the glass panes thereby forming a sealed cavity having a cavity pressure between the first glass pane and the second glass pane;
- a number of spacers positioned between the first glass pane and the second glass pane inside the sealed cavity; and
- at least one non-evaporable getter positioned on the inner surface of the first glass pane inside the sealed glass pane; and
- a layer of oxides, carbides, nitrides or similar positioned opposite the non-evaporable getter on the inner surface of the second glass pane.

Disclosed herein in a fourth aspect is a vacuum insulated glazing unit comprising:
- a first glass pane and a second glass pane with inner surfaces opposing each other;
- a side seal material positioned between edges of the glass panes thereby forming a sealed cavity having a cavity pressure between the first glass pane and the second glass pane;
- a number of spacers positioned between the first glass pane and the second glass pane inside the sealed cavity; and at least one getter having a surface comprising a pattern in the form of a code, a logo or similar.

By having a pattern in the getter, information on the getter properties and/or the glass panes properties and/or the vacuum insulated glazing unit properties can easily be included in the vacuum insulated glazing unit.

Disclosed herein in a fifth aspect is a vacuum insulated glazing unit comprising:
  a first glass pane and a second glass pane with inner surfaces opposing each other;
  a side seal material positioned between edges of the glass panes thereby forming a sealed cavity having a cavity pressure between the first glass pane and the second glass pane;
  a number of spacers positioned between the first glass pane and the second glass pane inside the sealed cavity; and
  at least one getter having:
  a first surface part with a first linear length, a first linear width, and a first surface area; and
  a second surface part with a second linear length, a second linear width, and a second surface area,
  wherein the first length is identical to the second length and the first width is identical to the second width, and
  wherein the first surface area is larger than the second surface area by at least 20%, such as at least 30%, such as at least 40%, or such as at least 50%, or such as at least 100%, or such as at least 150%, or such as at least 200%, or such as at least 300%.

By the linear length and the linear widths of the two surfaces being the same, but the surface area being different is obtained a more uneven surface area in the second surface compared to the first surface. Thus, the linear lengths may be seen as defining a periphery/perimeter of the respective surface area. The difference is due to a difference in surface topology. By the increased getter surface area is ensured an optimum function of the getter, which in turn prolongs the lifetime of the vacuum insulated glazing unit (VIG unit) by maintaining and possibly even reducing the pressure inside the VIG unit over time.

Disclosed herein in a sixth aspect is a vacuum insulated glazing unit comprising: o a first glass pane and a second glass pane with inner surfaces opposing each other;
  a side seal material positioned between edges of the glass panes thereby forming a sealed cavity having a cavity pressure between the first glass pane and the second glass pane;
  a number of spacers positioned between the first glass pane and the second glass pane inside the sealed cavity; and
  at least one getter having a surface with an increased surface area obtained by laser ablation with a pulsed laser emitting pulses with a pulse length of 500 picosecond or shorter.

By using a pulsed laser emitting pulses with a pulse length of 500 picosecond or shorter, a roughened getter surface can be created. The roughened getter surface will have an increased getter surface area. This ensured an optimum function of the getter, which in turn prolongs the lifetime of the vacuum insulated glazing unit (VIG unit) by maintaining and possibly even reducing the pressure inside the VIG unit over time.

When producing a vacuum insulated glazing unit according to any of the above aspects, widely available materials can be used. This ensures that the production cost can be kept at a low level. Also, the getter used in any of the above aspects may be concealed in a sash of window into which the vacuum insulated glazing unit is inserted. The getter used in any of the above aspects may easily be adjusted in size to match size of cavity and/or the species, which the getter is to capture.

Disclosed herein in a seventh aspect is the use of a getter in a vacuum insulated glazing unit, the vacuum insulated glazing unit comprising:
  a first glass pane and a second glass pane with inner surfaces opposing each other;
  a side seal material positioned between edges of the glass panes thereby forming a sealed cavity between the first glass pane and the second glass pane;
  a number of spacers positioned between the first glass pane and the second glass pane inside the sealed cavity, wherein the getter is positioned inside the sealed cavity.

The getter may have a surface having an uneven surface structure, the uneven surface structure comprising a plurality of depressions, wherein each pair of two consecutive depressions are spaced apart with a depression distance being at the most 25 µm.

Disclosed herein in an eighth aspect is the use of a getter in a vacuum insulated glazing unit, the vacuum insulated glazing unit comprising:
  a first glass pane and a second glass pane with inner surfaces opposing each other;
  a side seal material positioned between edges of the glass panes thereby forming a sealed cavity between the first glass pane and the second glass pane;
  a number of spacers positioned between the first glass pane and the second glass pane inside the sealed cavity.

The getter may be adapted for being positioned on the inner surface of the first glass pane, wherein the fixation member is positioned on the surface of the getter and pressing against at least one of the inner surface.

Disclosed herein in a ninth aspect is a method for activating a getter inside a vacuum insulated glazing unit, the method comprising:
  providing a vacuum insulated glazing unit comprising:
  a first glass pane and a second glass pane inner surfaces opposing each other;
  a side seal material positioned between edges of the glass panes thereby forming a sealed cavity having a cavity pressure between the first glass pane and the second glass pane;
  one or more spacers positioned between the first glass pane and the second glass pane inside the sealed cavity; and
  at least one metal-based getter positioned inside the sealed cavity, the metal-based getter having a surface,
  activating the surface of the metal-based getter by laser ablation using a pulsed laser emitting pulses with a pulse length of 500 picosecond or shorter.

Disclosed herein in a tenth aspect is a method for activating a getter inside a vacuum insulated glazing unit, the method comprising:
  providing a vacuum insulated glazing unit comprising:
  a first glass pane and a second glass pane inner surfaces opposing each other;
  a side seal material positioned between edges of the glass panes
  thereby forming a sealed cavity having a cavity pressure between the first glass pane and the second glass pane;
  one or more spacers positioned between the first glass pane and the second glass pane inside the sealed cavity; and
  at least one metal-based getter positioned inside the sealed cavity, o activating the surface of the metal-based getter by laser ablation using a pulsed laser emitting pulses with a pulse length of 50 picosecond or shorter.

Disclosed herein in an eleventh aspect is a method for activating a getter inside a vacuum insulated glazing unit, the method comprising:

providing a vacuum insulated glazing unit comprising:
a first glass pane and a second glass pane inner surfaces opposing each other;
a side seal material positioned between edges of the glass panes
thereby forming a sealed cavity having a cavity pressure between the first glass pane and the second glass pane;
one or more spacers positioned between the first glass pane and the second glass pane inside the sealed cavity; and
at least one metal-based getter positioned inside the sealed cavity, o activating the surface of the metal-based getter by laser ablation using a pulsed laser emitting pulses in the wavelength range of 850-2500 nm and with a pulse length of 500 picosecond or shorter.

By laser ablation is meant the process of removing material from a surface, most often a solid surface, by irradiating it with a laser beam. When using continuous wave lasers or pulsed lasers having a long pulse duration, the material is heated by the absorbed laser energy and evaporates or sublimates. When using pulsed lasers having a short pulse duration, the material may be converted to a plasma, as the short pulses often facilitates a high intensity in each pulse while still having a relative low average laser light intensity. In order to obtain a high peak intensity, a pulsed lased is normally used, why some understand the term laser ablation as referring to removing material with a pulsed laser. This is also the case in the examples described herein.

Using a pulsed laser with pulsed below 500 picoseconds for laser ablation of the getter thereby activating it, may provide a getter surface comprising a multiple of micro-scaled protrusions and depressions in the getter surface. Thereby a very large getter surface area is obtained, which ensures an optimum function of the getter and prolongs the lifetime of the vacuum insulated glazing unit by maintaining and possibly even reducing the pressure inside the VIG unit over time.

Using a laser with pulses of 500 picoseconds or shorter, a plasma is created, which is very localized. Thus, compared to using a laser having longer pulses such as a nanosecond laser, a microsecond laser or even a continuous wave laser for laser ablation, problems with surface debris, heat transfer to a large area surrounding the laser ablated material, generation of micro cracks in surrounding material, and overheating of the material, is avoided. The short pulsed laser with pulses shorter than 500 picoseconds therefore provide a highly well-defined laser ablated getter area.

Disclosed herein in a twelfth aspect is a vacuum insulated glazing unit obtained by the method described above.

Disclosed herein in a thirteenth aspect is a window comprising a vacuum insulated glazing unit according to the above.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the claimed disclosure or as a limitation on the scope of the claimed disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

DETAILED DESCRIPTION

Figure 1A:
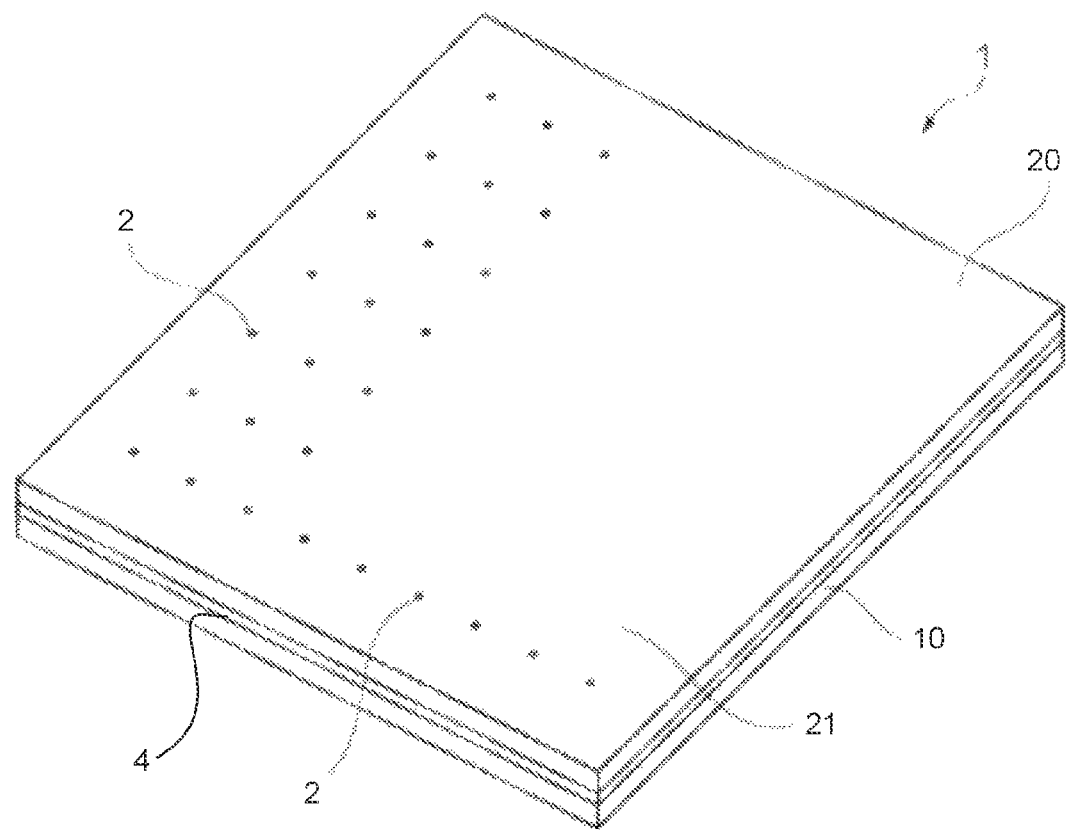
FIGS. 1A-B show an example of a vacuum insulated glazing (VIG) unit in a top-down slightly sideward view and a side-ward view (1 B).

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or"bottom" and "upper" or "top", "below" "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings.

For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within =30%, 20%, 10%, 5% of the stated value.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

Disclosed herein is a vacuum insulated glazing unit comprising:
   a first glass pane and a second glass pane with inner surfaces opposing each other;
   a side seal material positioned between edges of the glass panes thereby forming a sealed cavity having a cavity pressure between the first glass pane and the second glass pane;
   a number of spacers positioned between the first glass pane and the second glass pane inside the sealed cavity.

In a first aspect, the vacuum insulated glazing unit may comprise at least one getter positioned inside the sealed cavity, wherein the getter has a surface with an uneven surface structure, the uneven surface structure comprising a plurality of depressions, wherein each pair of two consecutive depressions are spaced apart with a depression distance being at the most 25 µm.

In a second aspect, the vacuum insulated glazing unit may comprise at least one getter positioned inside the sealed cavity, wherein the getter is fixed inside the sealed cavity by at least one getter fixation member positioned on a surface of the getter and pressing against at least one of the inner surface.

In a third aspect, the vacuum insulated glazing unit may comprise at least one non-evaporable getter positioned on the inner surface of the first glass pane inside the sealed glass pane; and a layer of oxides, carbides, nitrides or similar positioned opposite the non-evaporable getter on the inner surface of the second glass pane.

In a fourth aspect, the vacuum insulated glazing unit may comprise at least one getter positioned inside the sealed cavity, wherein the at least one getter having a surface comprising a pattern in the form of a code, a logo or similar.

In a fifth aspect, the vacuum insulated glazing unit may comprise at least one getter positioned inside the sealed cavity, wherein the at least one getter is having:
   a first surface part with a first linear length, a first linear width, and a first surface area; and
   a second surface part with a second linear length, a second linear width, and a second surface area,
   wherein the first length is identical to the second length and the first width is identical to the second width, and wherein the first surface area is larger than the second surface area by at least 20%, such as at least 30%, such as at least 40%, or such as at least 50%, or such as at least 100%, or such as at least 150%, or such as at least 200%, or such as at least 300%.

In a sixth aspect, the vacuum insulated glazing unit may comprise at least one getter positioned inside the sealed cavity, the at least one getter having a surface with an increased surface area obtained by laser ablation with a pulsed laser emitting pulses with a pulse length of 500 picosecond or shorter.

Referring to FIGS. 1A and 1 B, an example of a vacuum insulated glazing (VIG) unit 1 according to any of the above aspects is displayed in a top-down slightly sideward view and a side-ward view, respectively. The VIG unit comprises a first glass pane 10 and a second glass pane 20. The first glass pane 10 and the second glass pane 20 may be arranged in parallel. The first glass pane 10 has an outer surface 11, an inner surface 12 and a side surface 13. Likewise, the second glass pane 20 has an outer surface 21, an inner surface 22 and a side surface 23. The two inner surfaces 12, 22 are opposing each other. The naming of the surfaces inner and outer surface thus are merely a denotation of the positing of the glass panes in the VIG unit. The side surfaces 13, 23 are normally perpendicular in relation to the outer surfaces 11, 21 and the inner surfaces 12, 22. The surfaces may be similar in terms of surface structure and material.

In one or more examples, the pressure in the vacuum chamber is no higher than 0.001 mbar, such as no higher than 0.0005 mbar, such as no higher than 0.0001 mbar. Reducing the pressure in the internal cavity between the two tempered glass panes may be obtained by evacuating the internal cavity through the evacuation opening. Alternatively, the paring of the first glass pane 10 and the second glass pane 20 may be conducted under pressure in a vacuum chamber, thereby creating the reduced pressure without using an evacuation opening.

The first glass pane 10 and the second glass pane 20 each has a thickness defined by the distance between the inner surface 12, 22 and the outer surface 11, 21 of the glass panes 10, 20. The thickness of the two glass panes may be the same, which allows for usage of the same production lines for producing the glass panes. The thickness of the two glass pane may alternatively by different if e.g. coating or similar is used on one of the panes. A thinner glass pane may also be used for one of the glass panes possibly reducing production costs. The thickness of the glass panes may be between 1-8 mm, or between 1.5-6 mm, or between 2-5 mm, or between 2.5-4.5 mm.

The glass panes may further be laminated with a lamination material having a thickness of between 0.5-3 mm, or between 1-3 mm, or between 1-2.5 mm.

The glass panes are normally substantially transparent to visible light (i.e. at least about 50% transparent, more preferably at least about 70% transparent, more preferably at least about 80% transparent, and most preferably at least about 90% transparent), although they may be tinted in some examples.

Any suitable glass from which glass panes can be obtained may be used for the glass panes 10, 20. Examples include a soda lime silica glass and an alkali aluminosilicate glass.

In one or more examples, at least one of the first glass pane 10 and the second glass pane 20 is a tempered glass pane. The term "tempered glass pane" as used herein is understood to mean glass panes in which compressive stresses have been introduced in the surface(s) of the glass pane. For glass to be considered strengthened this compressive stress on the surface(s) of the glass can be a minimum of 69 MPa (10,000 psi) and may be higher than 100 MPa. The VIG is heated during production in order to form the periphery seal etc. and some glass strength may be annealed or lost during manufacture.

In one or more examples, the tempered glass panes have been tempered by thermal tempering, chemical tempering, plasma tempering, or a combination comprising at least one of the foregoing.

Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass.

The tempered glass panes may have been tempered by thermal tempering.

Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane.

Figure 1B:
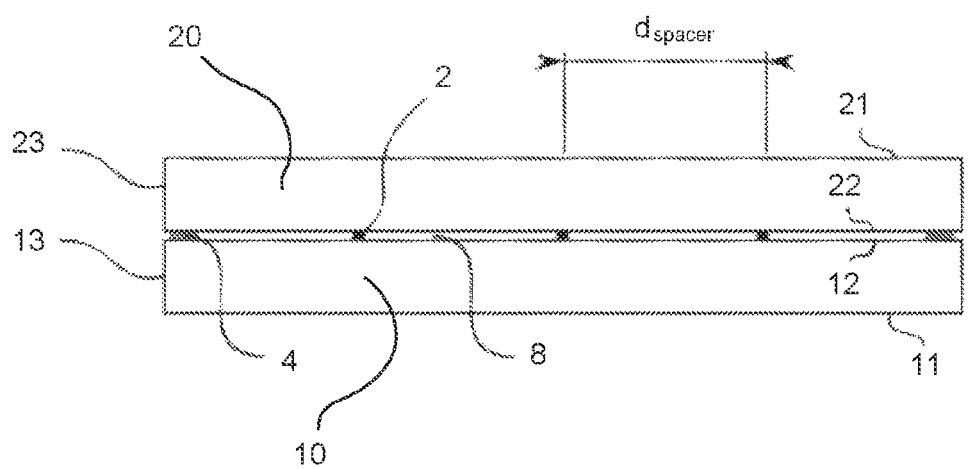

As shown in FIGS. 1A-B, between the opposed inner surfaces 12, 22 of the two glass panes 10, 20 in the VIG unit 1 are arranged spacers 2. By spacers 2 are meant any type of material, which may be used for preventing sagging and contact between adjacent glass panes 10, 20. The spacers 2 provide, and thus define the distance of, the void/gap 8 between the inner surfaces 12, 22 of the glass panes 10, 20. The spacers 2 may be integral or adhered to the inner surfaces 11, 22 of the glass panes 10, 20. The spacers 2 may alternatively be discrete and held in position by atmospheric pressure on the outer surfaces 11, 21 of the glass panes 10, 20.

An example of spacers 2 are the pillars as shown in FIGS. 1A and 1 B. However, the spacers 2 may have any suitable shape, for example spherical, cylindrical, square, rectangular, rod-like, bead-like, oval, trapezoidal, or the like.

The spacers 2 can be arranged in an array separated by a distance $d_{spacer}$ between adjacent spacers. The distance between spacers, or the spacer-to-spacer distance between each adjacent spacer, may be between 20 to 120 mm, such as e.g. 25 to 80 mm, or 30 to 60 mm. The distance between spacers may be measured from an outer edges of adjacent spacers. Alternatively, the distance between spacers may be measured from the centers of adjacent spacers. The spacer-to-spacer distance can be the same or different between each adjacent spacer. Using the same spacer-to-spacer distance may simplify the process of positioning the spacers on one of the glass panes as the same settings can be used in the tool, which places the spacers. Using a different spacer-to-spacer distance may create a VIG unit where the user less easily notices the spacers when looking out the window into which the VIG unit has been inserted as the eye often pays less attention to an uneven and random positioning of spacers compared to an even-structured positioning. Greater distances between spacers can increase the compressive load on each spacer and can cause a VIG unit to lose vacuum due to stress and cracks. A denser positioning of the spacers may therefore be used in specific region to increase the robustness of the VIG unit.

The spacers may have a height of 0.05 to 0.7 m, such as between 0.1 to 0.4 mm, or between 0.15 to 0.3 mm. In one or more examples, the spacers have the same height. This keeps the production cost low as only one type of spacer is needed.

The tool used for positioning the spacers on the glass pane will further not need to have individual settings for placing spacers with a difference in height.

The spacers may alternatively have the different heights, including at least two different heights. As the distance between the two glass panes 10, 20 may vary from region to region in VIG unit, a difference in height of the spacers will allow for compensation of these distance variations. In one or more examples, each spacer independently has a height of 0.05 to 0.7 mm, preferably 0.1 to 0.4 mm, more preferably 0.15 to 0.3 mm.

The spacers may have a width of between 0.1 to 1 mm, or between 0.2 to 0.8 mm, such as between 0.3 to 0.7 mm. Again, the width of the individual spacers may be the same or may be different.

The spacer can be any suitable material, for example solder glass, a polymer (e.g., Teflon), plastic, ceramic, glass, metal, or the like. In one or more examples, the spacer comprises a steel or a solder glass.

The spacer can include a surface coating that is disposed on the outer surface of the spacer to reduce cracks in the glass panes and reduce scratches when the glass panes flex and move. Any suitable surface coating may be used, for example a surface coating that comprises a low coefficient of friction (e.g., has a lower coefficient of friction than the spacer material). The surface coating can include tungsten disulfide (WS2), molybdenum disulfide (M0S2), tungsten diselenide (WSe2), molybdenum diselenide (MoSe2), or a combination thereof. In some examples, the surface coating is disposed on the top and/or bottom of the spacer. As used herein, "top" and "bottom" of the spacer means the portions of the spacer configured to contact the glass pane, for example that contact the spacer contact regions of the glass pane. In one or more examples, the surface coating is in contact with the inner surface of at least one of the glass panes.

In one or more examples, at least one of the inner surface 12 of the first glass pane 10 and the inner surface 22 of the second glass pane 20 comprises a low-emittance coating layer. By low-emittance coating layer is included a low-emittance or low-emissivity low-E surface coating. Any suitable low-E coating can be used. In one or more examples, the inner surface of at least the first glass pane 10 further comprises a low-emittance coating. For example, the inner surfaces 12, 22 of the first and second glass panes 20 can each have the same or different low-emittance coatings. In one or more examples, the inner surface of a glass pane comprising the strengthened portion further comprises a low-emittance coating. Low-E coating may comprise several layers, including silver layers. Low-E coatings can include a layer of an infrared-reflecting film and one or more optional layers of a transparent dielectric film. The infrared-reflecting film, which can include a conductive metal such as silver, gold, or copper, reduces the transmission of heat through the coated pane. A dielectric film can be used to anti-reflect the infrared-reflecting film and to control other properties and characteristics of the coating, such as color and durability. Commonly used dielectric materials include oxides of zinc, tin, indium, bismuth, and titanium, among others.

Example low-E coatings include one or two silver layers each sandwiched between two layers of a transparent dielectric film. Increasing the number of silver layers can increase the total infrared reflection, although additional silver layers can also reduce the visible transmission through the window and/or negatively impact the coating's color or durability.

As shown in FIGS. 1A-B, a side seal material 4 is arranged between the first glass pane 10 and the second glass pane 20 creating an internal void/gap/cavity 8 between the glass panes 10, 20. The side seal material 4 is normally attached around the periphery of the first glass pane 10 and the second glass pane 20 and forms a sealed cavity 8 between the glass panes 10, 20. The side seal material 4 in FIG. 1A is positioned between the inner surfaces 12, 22 of the two glass panes 10, 20 near the edges of the two inner surfaces 12, 22. The side seal material 4 may alternatively or additionally be positioned on the side surfaces 13, 23 of the glass panes 10, 20.

Any suitable side seal material known in the industry can be used.

The side seal material may be a soldering material, for example a glass solder frit material. The glass solder frit material may have a low melting temperature, wherein thermal treatment can be used to hermetically seal the periphery of the VIG unit.

In an example, the glass solder frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. The soldering material may be provided as a combination of two different materials comprising glass solder frit with different thermal expansion coefficients that are adjusted to correspond to the thermal expansion coefficients of the bonded parts. Also several solder materials may allow pre-sintering of a first solder to the glass surface and subsequently use of a second solder to join to the first solder.

In one or more examples, the side seal material may be a lead free solder glass material. In one or more examples, the side seal material comprises less than 0.1% lead. For example, side seal material may be a vanadium-tellurium oxide solder glass material.

In one or more examples, the low melting point solder glass material comprising the following ingredients: tellurium dioxide, divanadium pentaoxide, aluminum oxide in glasses/pigments and manganese dioxide. The concentrations of the ingredient may be 30-50% tellurium dioxide, 20-30% divanadium pentaoxide, 5-10% aluminum oxide in glasses/pigments and 1-5% manganese dioxide.

In one or more examples, the glass material in the side seal material may be a glass powder material, such as an amorphous glass powder material, that is heated and melted by means of a heating arrangement before it is applied. Thus, the side seal material may be an amorphous glass solder material.

Figure 2A:
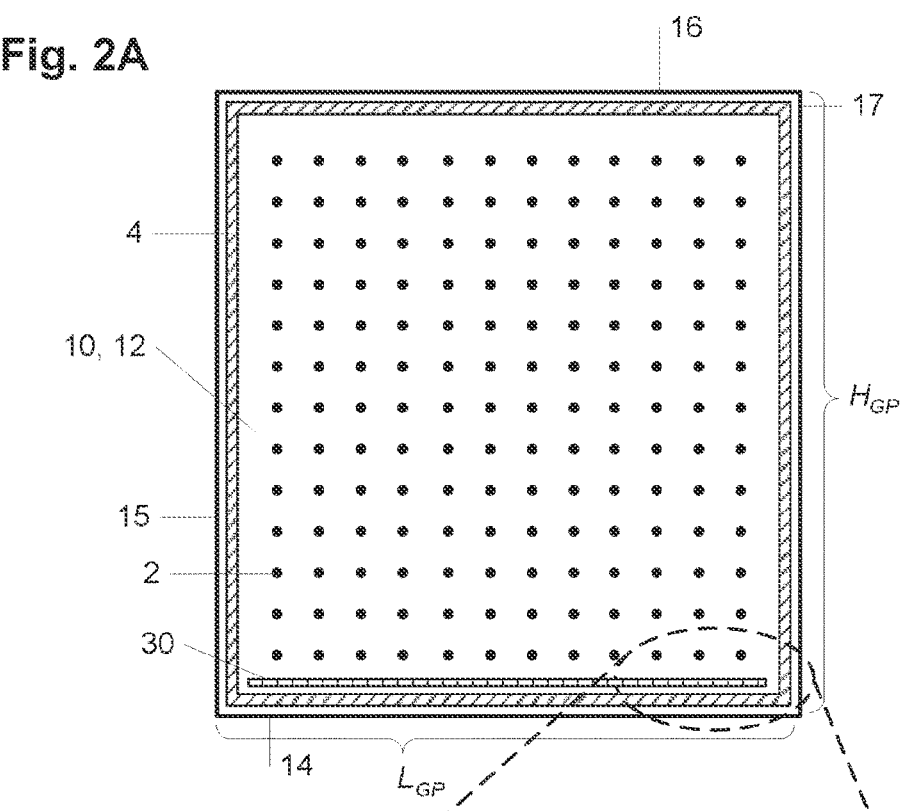
FIG. 2A shows a top-down view of a first glass pane in a VIG unit with FIG. 2B being a close-up of FIG. 2A.
Figure 2B:
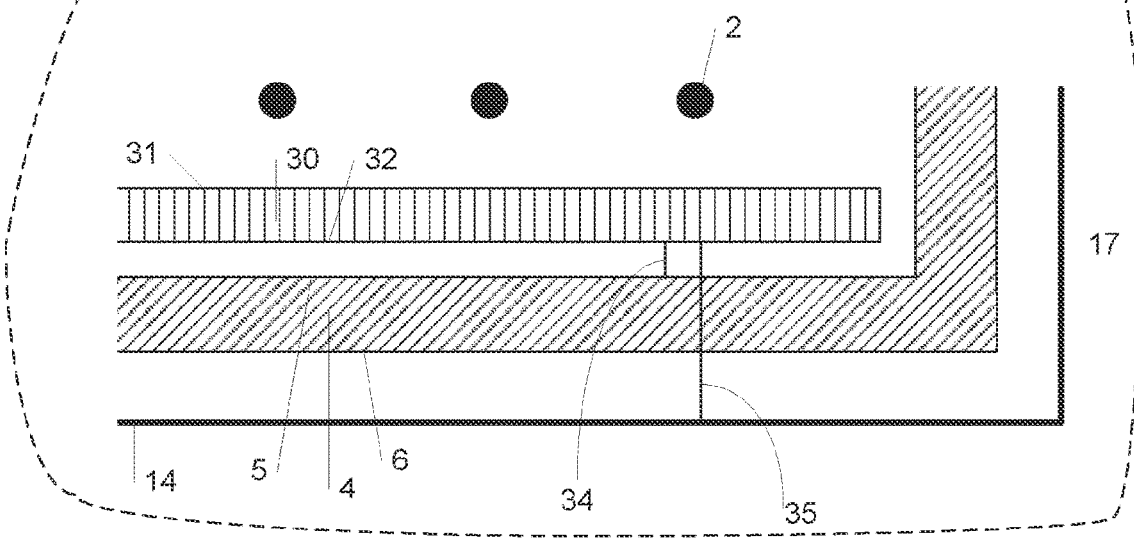
FIG. 2C shows a schematic example of a getter in a perspective view.

FIG. 2A shows a top-down view of the first glass pane 10 with the inner surface 12 pointing upwards. In FIG. 2B, a close-up of part of FIG. 2A is shown. Spacers 2 and the side seal material 4 are positioned on top of the inner surface 12. The first glass pane 10 has four edges; a first edge 14, a second edge 15, a third edge 16, and a fourth edge 17. The first edge 14 and the third edge 16 are opposing each other, and the second edge 15 and the fourth edge 17 are opposing each other. The edges 14, 15, 16, 17 are at the periphery of the glass pane 10.

A getter 30 may be positioned close to the first edge 14 as shown in FIGS. 2A-B. The getter 30 may be a non-evaporate getter (NEG) which may comprise a metallic surface, which is responsible for sorption of gas molecules. The getter is constituted from materials that readily form stable compounds with active gases. Before use of a getter, drying and/or annealing of the getter at approximately 700-800 degrees C. for around 20 min-6 hours may be used for driving out hydrogen from the getter.

In one or more examples, the getter is a metal-based getter. The metal-based getter may comprise one or more metals selected from group IV elements. In one or more examples, the one or more metals is titanium, aluminum, zirconium, chromium, vanadium, or alloys thereof.

In one or more examples, the getter is a non-evaporable getter NEG.

In the figures, the getter 30 is shown as an elongated strip positioned only at the first edge 14 of the first pane 10. Thus, in one or more examples, the getter may be an elongated strip.

The getter 30 may also or alternatively be positioned along any of the other edges 15, 16, 17. Yet alternatively, the getter 30 may be found along more than one edge, such as along two edges, or three edges, or all four edges. Also, the getter may have alternative shapes such as a square. Also, a multiple of getters may be used as an alternative to one long strip getter.

Figure 2C:
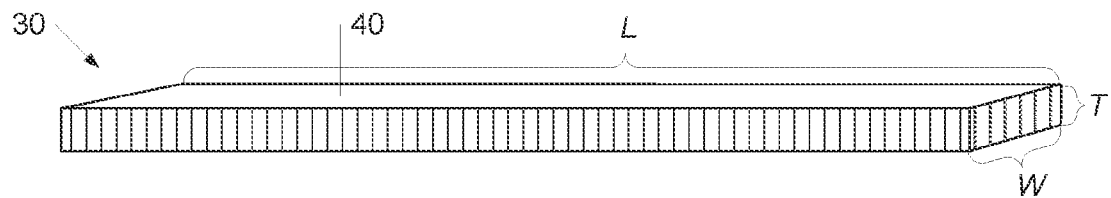

A schematic example of a getter 30 is shown in a perspective view in FIG. 2C, where the length L, the width W, and the average thickness T are marked. Normally, when the getter 30 is elongated, the L is at least twice of W.

In one or more examples, the thickness 7 is 0.100 mm or less, such as 0.050 mm or less, such as 0.040 mm or less, such as 0.035 mm or less, such as 0.030 mm or less, such as 0.025 mm or less, such as 0.020 mm or less. Alternatively, or additionally, the thickness 7 may be in the range of 0.005-0.150 mm, such as 0.010-0.100 mm, such as 0.015-0.750 mm, such as 0.015-0.500 mm, such as 0.015-0.400 mm, such as 0.015-0.300 mm, such as 0.020-0.300 mm.

In one or more examples, the width W is in the range of 0.5-10 mm, such as 1-8 mm, such as 1-6 mm, such as 1-5 mm, such as 2-4 mm, such as 2-3 mm.

The getter 30 has an inner edge 31 pointing towards the center of the sealed cavity 8, and an outer edge 32 pointing towards the closest edge of the glass pane 10, where the side seal material 4 is found. Likewise, the side seal material 4 has inner edges 5 pointing towards the center of the sealed cavity 8. If the side seal material 4 is positioned only on the inner surfaces 12, 22 it also an outer edge 6 found towards the closest edge of the glass pane 10. The distance between the getter 30 and the inner edge 5 of the side seal material 4, and the distance from the getter 30 to the closest edge of the first glass pane 10 is denoted 34 and 35, respectively, in FIG. 2I3.

In one or more examples, the getter 30 is positioned at a distance 34 from an inner edge 5 of the side seal material 4 of at the most 35 mm, such as at the most 30 mm, such as at the most 25 mm, such as at the most 20 mm, such as at the most 15 mm, such as at the most 10 mm. Alternatively, or additionally, the getter 30 may be positioned at a distance 35 from the edge of the first glass pane 10 of at the most 40 mm, such as at most 35 mm, such as at most 30 mm, such as at most 25 mm, such as at most 20 mm.

At these distances, the getter 30 may be hidden behind a frame/sash in a window, when the VIG unit 1 is assembled in a window.

In one or more examples, the getter 30 is positioned at a distance 34 from an inner edge 5 of the side seal material 4 of at least 5 mm, such as at least 10 mm, such as at least 15 mm. By ensuring that there some distance between the getter 30 and the side seal material 4, activation of the getter 30 after/during assembly of the VIG unit, does not affect the side seal material 4.

The first glass pane 10 may vary in length and height. In FIG. 2A, the length LGP and the height HGP is shown. In some examples, the length L of the getter will be 98% that of LGP or less. Alternatively, or additionally, the length L of the getter 30 may be at least 20 mm smaller than that of LGP.

Figure 3:
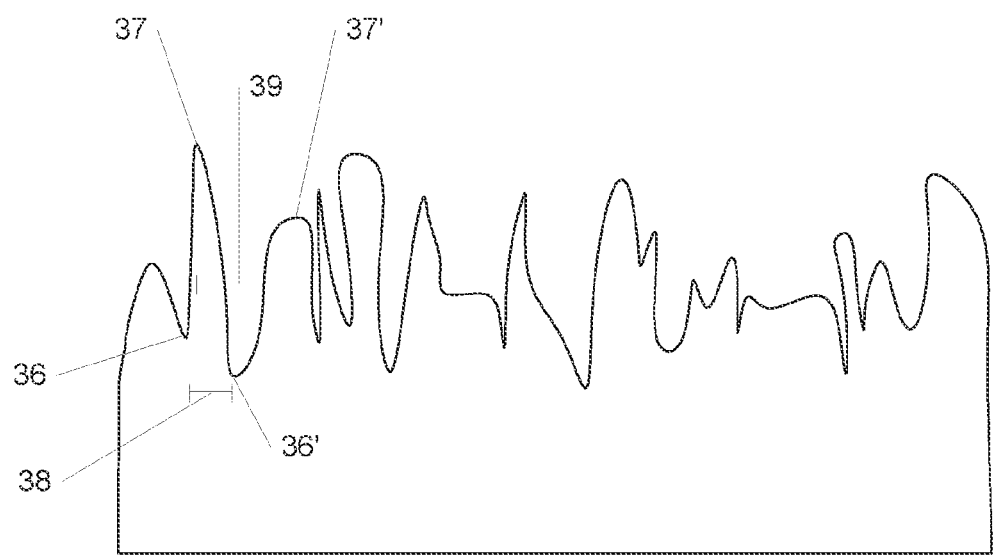
FIG. 3 illustrates a getter surface structure after being activated b laser ablation.

When activating the getter 30, laser ablation is normally used. This creates an uneven surface 40 on the getter 30 as illustrated in FIG. 3. The uneven surface structure has a plurality of depressions 36, wherein each pair of two consecutive depressions 36 are spaced apart with a depression distance 38. Alternatively, one be describe the uneven surface structure as having a plurality of protrusions 37, wherein each pair of two consecutive protrusions 37 are spaced apart with a protrusion distance 39. In one or more examples, the depression distance 38 and/or the protrusion distance 39 is at the most 25 µm. Examples of a getter 30 after it has been activated by laser ablation is shown in the SEM images in FIGS. 5A-E. The resolution increases from figure SA to FIG. 5D/5E as shown in each of the SEM images. The SEM image shown in FIGS. 5A-E are obtained using a 20 kV picosecond laser emitting pulses with a pulse length of 3 ps, and with a spot size of 17 microns.

The variation in surface height is seen in the SEM images as variations in brightness of the image. Thus, the lighter colored parts of the surface 40 are the protrusions and the darkest colored parts of the surface 40 are the depressions. The surface topology and the dimensions of the protrusions and the depressions can be obtained from the SEM images.

In one or more examples, the depression distance 38 and/or the protrusion distance 39 is at the most 20 µm, such as at the most 15 µm, such as at the most 10 µm, such as at the most 5 µm, such as at the most 2 µm, such as at the most 1 µm, such as at the most 0.5 µm, such as at the most 0.25 µm, such as at the most 0.1 µm.

Figure 5A:
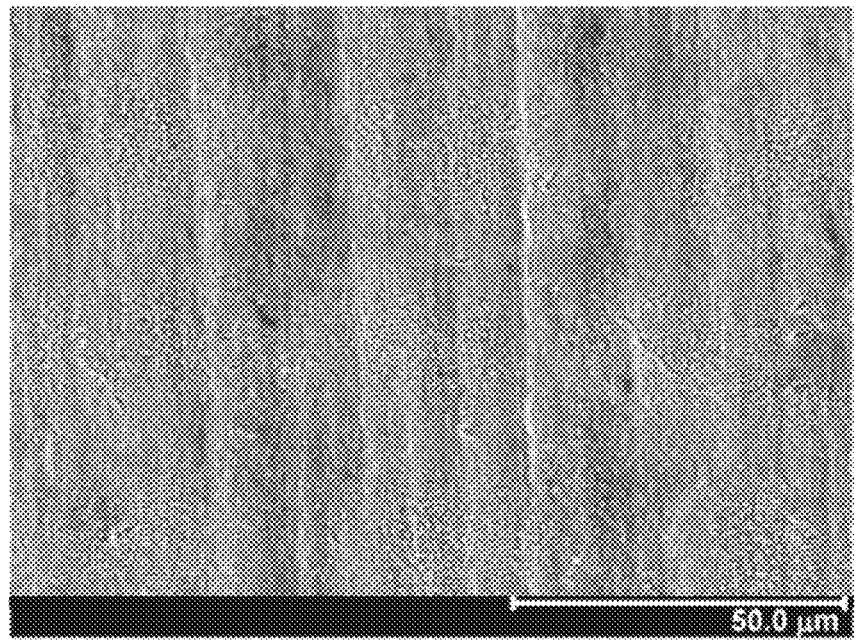
FIGS. 5A-E show SEM images of a getter after being activated by laser ablation.
Figure 5B:
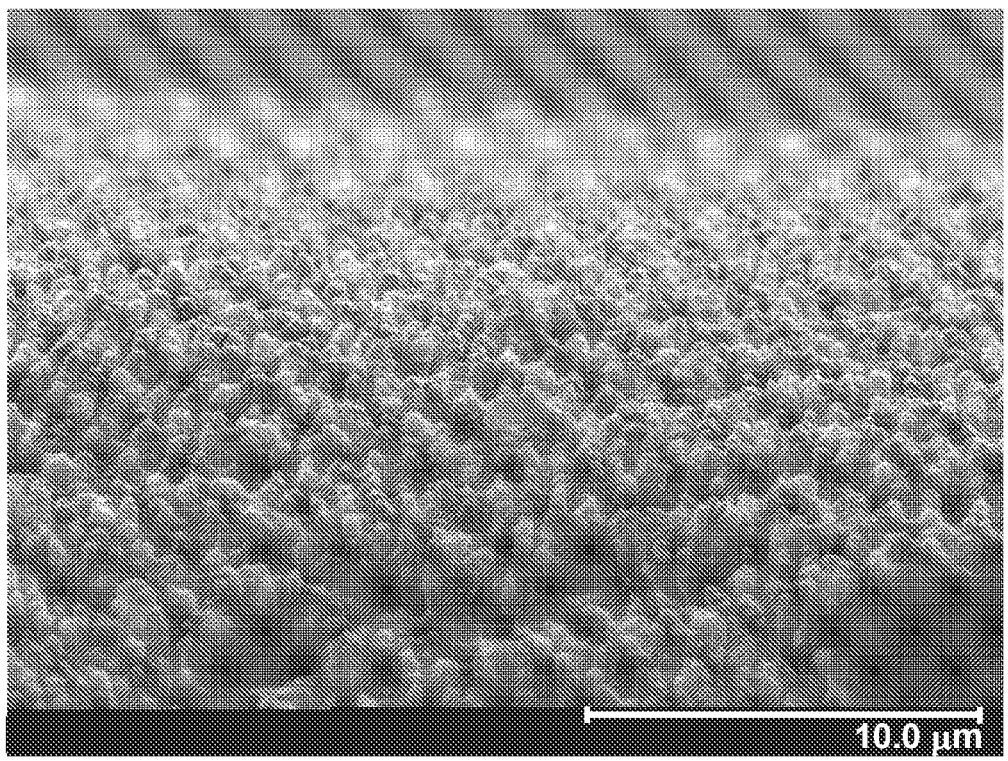
Figure 5C:
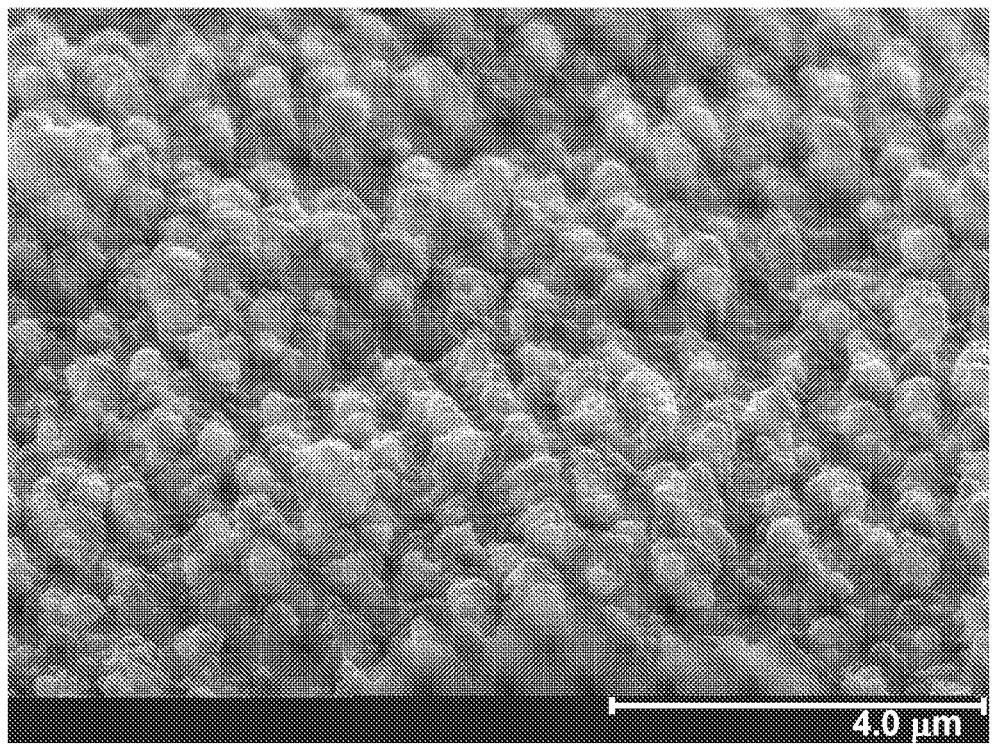
Figure 5D:
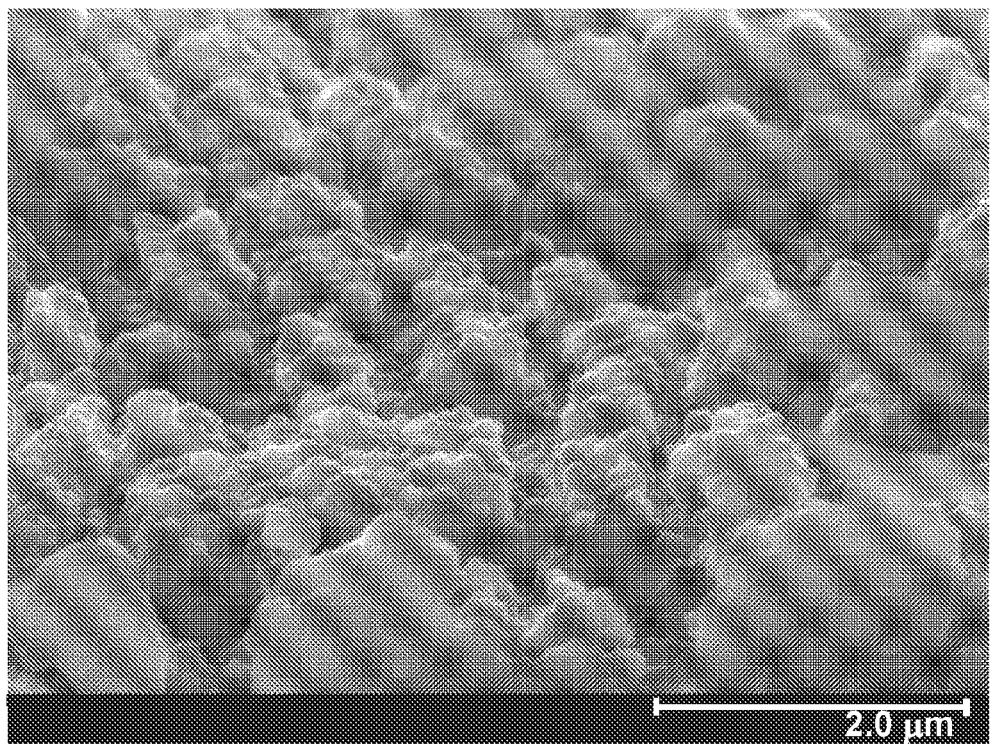
Figure 5E:
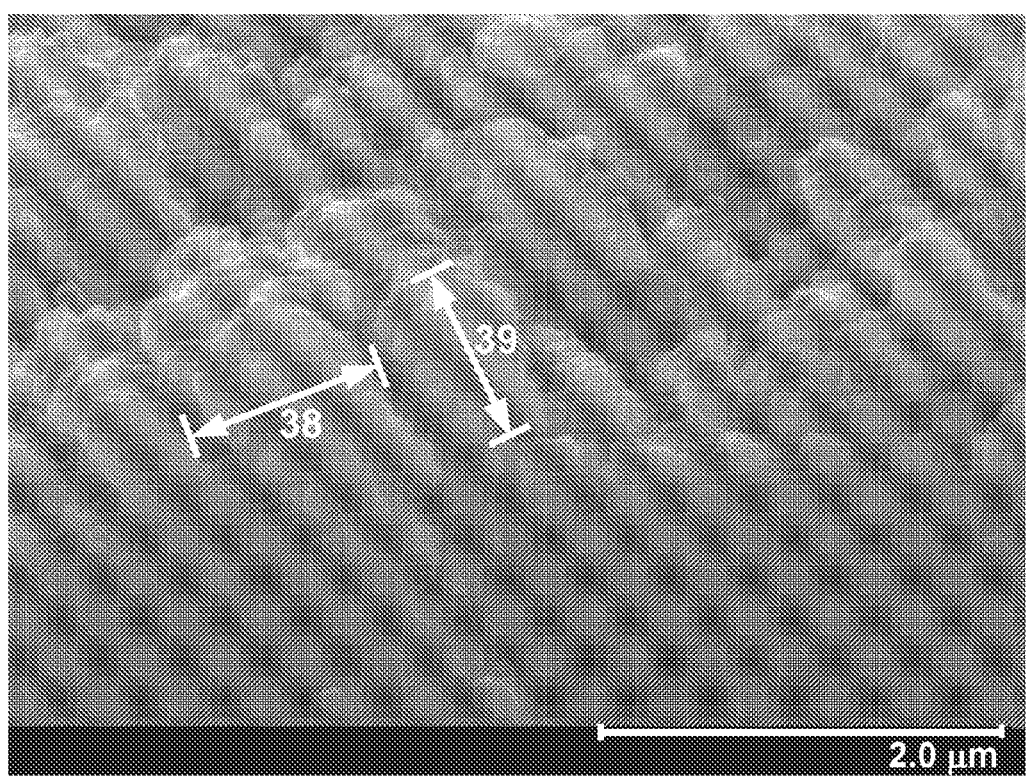

In FIG. 5E, a depression distance 38 of 1.01 µm and a protrusion distance 39 of 0.91 p is shown. As apparent form FIG. 5E, smaller distances 38, 39 are also obtainable.

The distance between pairs of depressions and pairs of protrusions normally varies depending on how the laser has moved over the getter 30 when ablating the surface 40 of the getter 30. The depressions 36 and/or protrusions 37 may therefore have an elongated shape. This is e.g. seen in FIGS. 5B-E.

When the metal-based getter is activated by laser ablation, the surface area of the getter increases. Thus, in one or more examples, the metal-based getter 30 has an initial surface area prior to activating the metal-based-getter 30 by laser ablation, and an activated surface area after activating the metal-based-getter 30 by laser ablation, wherein the activated surface area is larger than the initial surface area by at least 20%, such as at least 30%, such as at least 40%, or such as at least 50% or such as at least 100%, or such as at least 150%, or such as at least 200%, or such as at least 300%.

Figure 4:
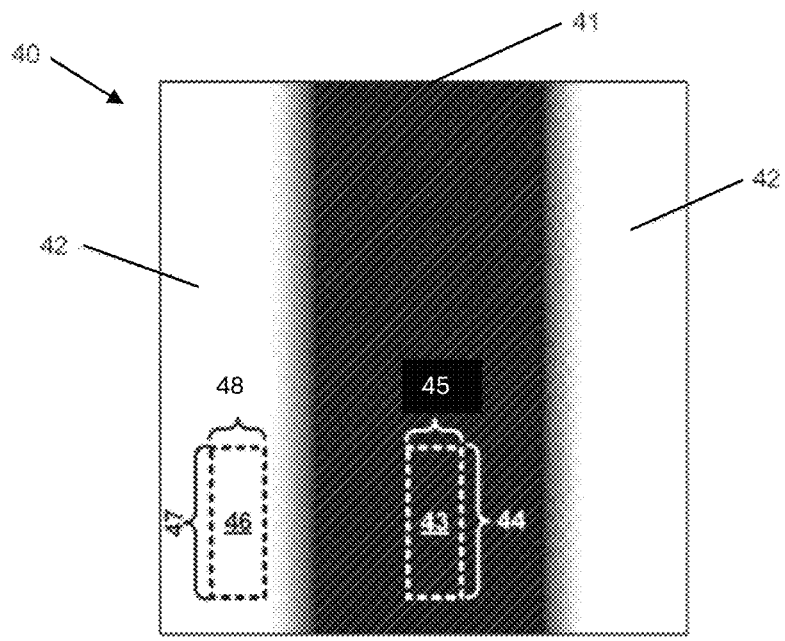
FIG. 4 illustrates schematically a getter after the surface has been activation by laser ablation.

FIG. 4 illustrates very schematically a getter 30 after the surface 40 has been activation by laser ablation. The illustration of a getter surface 40 shown in FIG. 4, has not been activated over the entire surface 40 and therefore comprises both a laser-ablated surface part 41, and one or more non-laser-ablated surface parts 42.

In FIG. 4, the non-laser-ablated surface part 42 is located on each side of the laser-ablated surface part 41. This creates a structure with a laser-ablated part 41 in the middle surrounded by non-ablated parts 42. By not laser ablating the entire surface 40 of the getter 30, the surface on the glass pane near the surface of the getter is not exposed to the laser. A low-E coating layer normally contains small gas inclusion, which may be released when exposed to laser 50 light. If the glass pane surface comprises a Low-E coating layer, it will not be damaged by the laser when choosing not to only laser ablate the surfaces/the inner and outer edges 31, 32 of the getter 30.

In FIG. 4 is also marked a first surface part 43 in the laser-ablated surface part 41 and a second surface part 46 in the non-laser-ablated surface part 42. Both surface parts have identical linear lengths 44, 47 and identical linear widths 45, 48. By linear length and width is meant the distance from end point to end point in a two-dimensional plane. The surface areas of the two surface parts 43, 46, however, differs, as the first surface area of the first surface part 43 is larger than the second surface area of the second surface part 46 by at least 20%, such as at least 30%, such as at least 40%, or such as at least 50%, or such as at least 100%, or such as at least 150%, or such as at least 200%, or such as at least 300%. The surface areas are a three-dimensional parameter.

The difference between the first surface area and the second surface area is due to differences in surface topology. In other words, the first surface area may be larger than the second surface area due to differences in surface topology.

In FIG. 4, the two surface parts are shown on the same surface. However, the two surface parts may also be an upper side of the getter opposite a lower side of the getter. The surface part may be the entire upper area/the entire lower area.

Figure 6A:
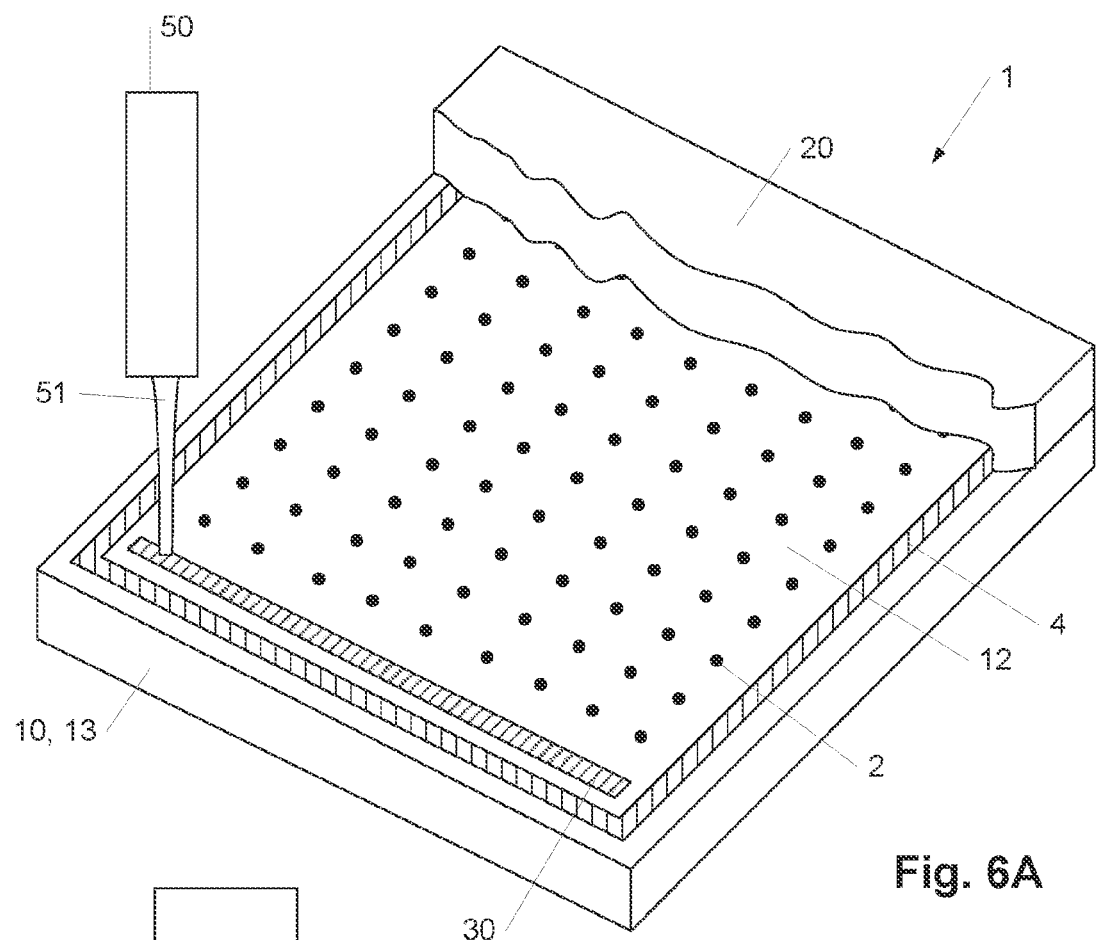
FIGS. 6A-B show a VIG unit, where the getter is being laser ablated, with FIG. 6A being a perspective view and FIG. 6B being a side view.

FIG. 6A show a perspective view of a VIG unit 1, where part of the second glass pane 20 has been removed in order to provide a better view of the inside of the VIG unit 1. Included in FIG. 6A is also a laser 50 emitting laser light 51 for activating the getter 30. As shown in side view in FIG. 6B, the laser light 51 travels through the second glass pane 20 before illuminating the surface 40 of the getter 30 positioned on the inner surface 12 of the first glass pane 10.

The getter 30 inside the vacuum insulated glazing unit 1 may be activated by laser ablation using a pulsed laser 50 emitting pulses with a pulse length of 500 picosecond or shorter.

In one or more examples, the pulsed laser 50 is a picosecond laser. Alternatively, the pulsed laser may be a femtosecond laser. If the pulsed laser 50 is a picosecond laser it may be emitting pulsed at or below 500 ps, such as at or below 250 ps, such as at or below 100 ps, such as at or below 50 ps, such as at or below 25 ps, such as at or below 10 ps, such as at or below 5 ps, such as at or below 3 ps.

If the pulsed laser 50 is a femtosecond laser it may be emitting pulsed below 1000 fs, such as below 500 fs, such as below 400 fs, such as below 300 fs, such as below 200 fs, such as below 100 fs, such as below 50 fs, such as below 10 fs.

The pulsed laser 50 will normally be emitting pulsed in the near infrared or infrared spectral region. In one or more examples, the laser 50 emits pulses in the wavelength range of 850-2500 nm, such as 850-2000 nm, such as 850-1500 nm, such as 900-1200 nm, such as 950-1100 nm, such as 1000-2500 nm, such as 1200-2500 nm, such as 1500-2500 nm, such as 1750-2500 nm, such as 1850-2500 nm, such as 2000-2500 nm, such as 2200-2500 nm.

Figure 6B:
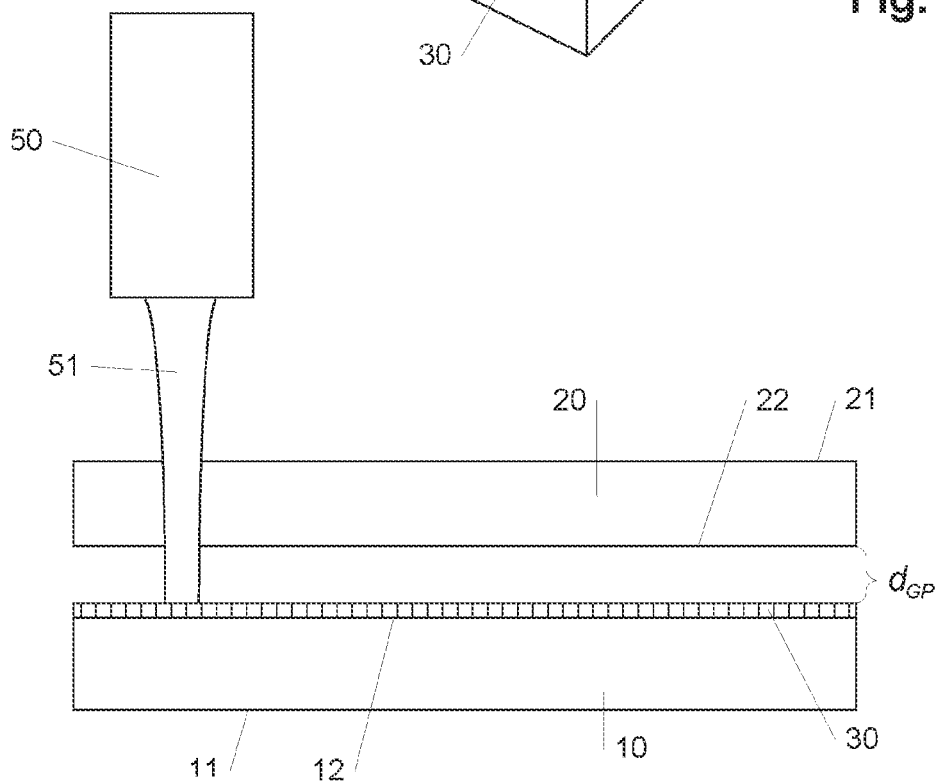

As shown in FIGS. 6A-B, the laser light 51 will normally be focused onto the getter 30. By focusing the laser light 51 onto the getter 30, a higher intensity of the light is obtained at the getter 30 compared to the through the second glass pane 20. Thus, in one or more examples, the pulsed laser 50 is focused onto the surface 40 of the getter 30.

The getter 30 may be metal-based. Metals such as titanium, aluminum, zirconium, chromium, vanadium, or alloys thereof may be used. Also, the metal-based getter may have an outer layer of oxides, carbides, nitrides or similar, which is accumulated on the metal-based getter 30 due to contact with air during the production of the VIG unit 1. When the pulsed laser 50 is illuminated onto the metal-based getter 30, the outer layer of oxides, carbides, nitrides or similar may be scattered onto the inner surface 22 of the second glass pane 20 opposing the metal-based getter 30 by the laser ablation. The layer of oxides, carbides, nitrides or similar will often be visible in the final product as a darkened surface part on the inner surface 22 of the second glass pane 20.

Figure 7A:
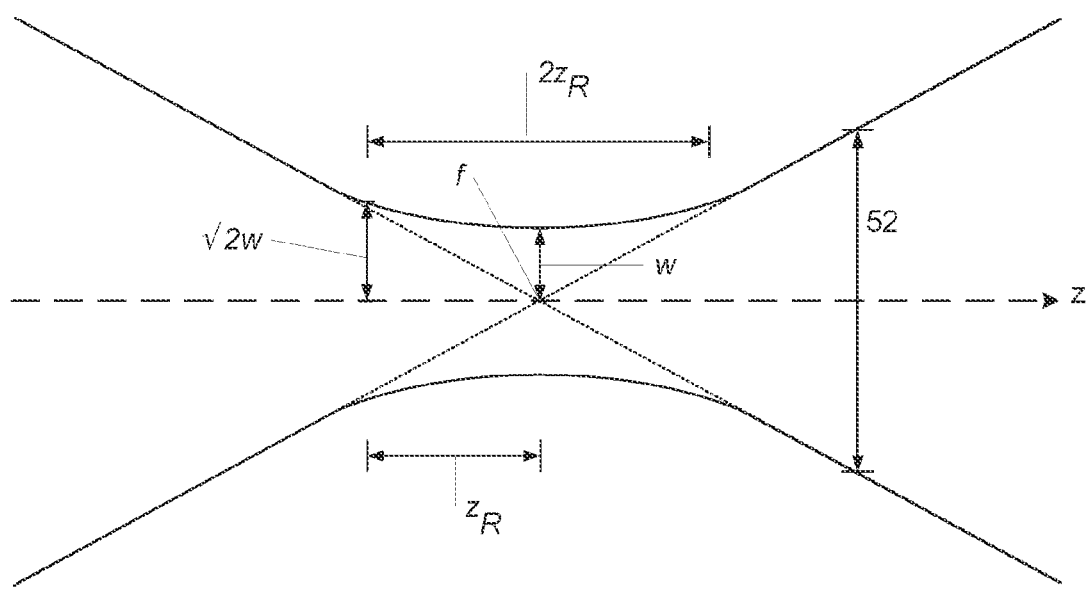
FIG. 7 A show a Gaussian beam around the focal point, and FIG. 7B a side view of a VIG unit where the getter is being laser ablated by a focused laser beam having a Gaussian profile.
FIG. 7C shows an example of a raster scanning pattern, where a laser is raster scanned over the surface of a getter.
Figure 7B:
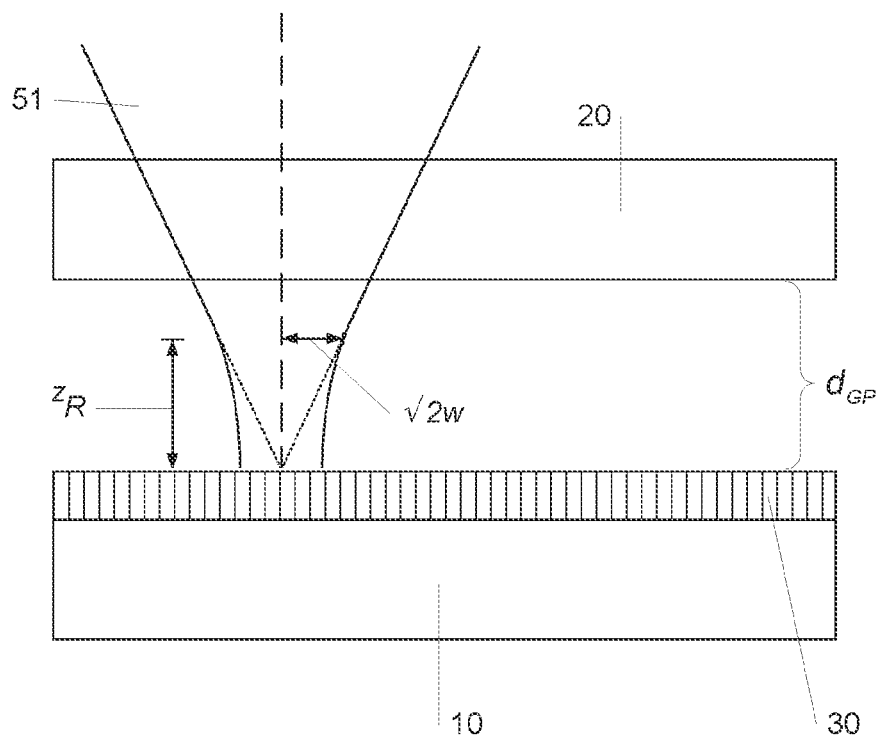

When focusing the laser light 51 from the pulsed laser 50, the focused light may be described as a Gaussian beam around the focal point of the laser beam 51. By focal point f is meant the narrowest point of a Gaussian beam as illustrated in FIG. 7 A showing the propagation of a focused laser light along the direction z. A Gaussian beam is regarded as having a beam waist w at the focal point of the focused laser light 51 marking the radial size of the beam at its narrowest point, i.e. at the focal point f. The Gaussian beam also has a Rayleigh length $Z_R$ defined by:

$$ZR = p\ w^2/1$$

where 1 is the wavelength of the focused pulsed laser light 51. The Rayleigh length $Z_R$ and the propagation of the Gaussian beam is illustrated in FIG. 7A. In order to avoid plasma from the focused laser beam 51 on the inner surface 22 of the second glass 20 opposite the getter 30, the distance from the getter 30 to the second glass pane 20 needs to be larger than the Rayleigh length ZR. The distance from the getter 30 to the opposite inner glass surface 22 of the second glass pane 20 is illustrated in FIG. 713, where also the Rayleigh length $Z_R$ of the focused pulsed laser beam 51 is shown.

The focused pulsed laser light 51 has a diameter 52, which differs along the direction z which the laser light 51 propagates in when the laser light 51 is being focused. At the point where the laser light 51 comes in contact with the getter surface 40, the diameter 52 is also referred to as the laser spot size. In one or more examples, the laser spot size is in the range of 2-50 µm, such as of 5-40 µm, such as of 5-30 µm, such as of 10-25 µm, such as of 15-20 µm, such as e.g. 17 µm.

The intensity of the laser light 51 at the getter surface, can be controlled by moving the laser 50 towards or away from the VIG unit 1, as this moves the focal point relative to the getter surface 40. Also, the intensity of the laser light 51 at the getter surface 40 can be altered by using a lens with a longer or shorter focal length for focusing the laser light 51 onto the getter surface 40.

As the spot size 52 of the laser light 51 is normally somewhat smaller than the length of the getter 30 and perhaps also the width of the getter 30, the laser 50 needs to move in order to activate the majority or entire getter 30. Raster scanning the pulsed laser 50 over the surface 40 of the getter 30 is an often-used method for activating a larger part, e.g. the entire length, of the getter 30. By raster scanning is also included moving the laser 50 forth and back such that the same position on the getter 30 is exposed to laser light multiple times. The laser 50 can be moved in a direction along the length of the getter and/or along the width of the getter 30 when using raster scanning.

Figure 7C:
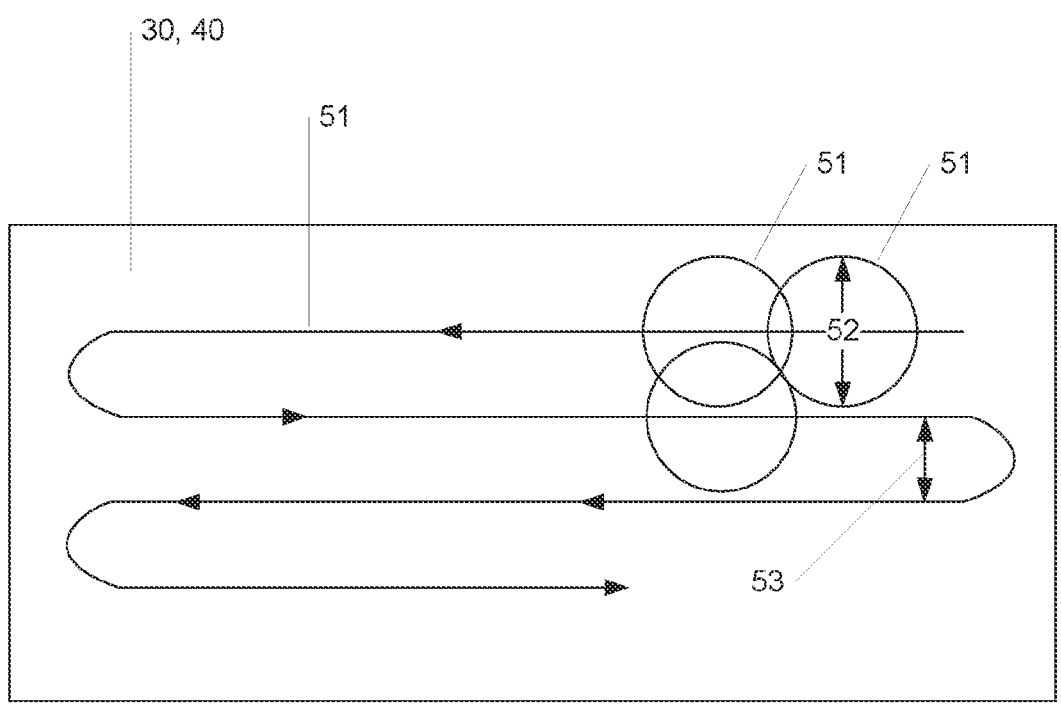

As shown in FIG. 7C, an example of a raster scanning pattern is shown, where the focused laser 51 having a laser spot size marked as 52 is raster scanned over the surface 40 of the getter 30 along the direction marked with the arrows. The distance between two consecutive scans lines is referred to as a hatch and marked in FIG. 7C with reference 53.

Thus, in one or more examples, two consecutive scan lines have a distance between them referred to as a hatch, wherein the hatch is 40-60% of the laser spot size 52, such as 45-55% of the laser spot size, such as e.g. 50% of the laser spot size. In one or more examples, the hatch is in the range of 1-25 µm, such as of 2-15 µm, such as of 4-12 µm, such as of 6-10 µm, such as of 8-9 µm, such as e.g. 8.5 µm. By using a laser spot size 52, which is approximately twice of the hatch 53, each surface part on the getter is exposed to laser light at least twice. If the laser is raster scanned more than once along each scanning line, each surface part on the getter is exposed to laser light at least four times, or more.

The surface roughness on the getter surface 40 due to laser ablation depends on a number of things including the spot size of the laser light at the getter surface, the speed at which the laser is scanned over the getter surface, the hatch, the wavelength of the laser, the frequency of the laser, the material of the getter, and the laser power.

When the getter surface is laser ablated, the ability of the getter material to combine with gasses inside the VIG unit chemically or by absorption increases, thereby improving the "sorbed quantity". Table 1 shows the measurement of the ablation getter capacity measured by introducing a known amount of CO2 into a VIG unit with a titanium getter. In the first line of data in table 1, the getter has not been ablated, and in the remaining lines of data, the getter has been ablated using a picosecond laser. The pressure decrease inside the VIG unit is measured using Spinning roller gauge pressure measurement. Different means for measuring the pressure such as a roto meter, a flow meter, an ordered a mass spec type flow control meters, may be used.

TABLE 1

| | Sorbed quantity | | Laser | | | | | |
|---|---|---|---|---|---|---|---|---|
| | mbar · $cm^3$ | mbar · $cm^3/cm^2$ | Pulse (ps) | Power (%) | Frequency (kHz) | Speed (m/s) | Hatch (µm) | Iterations |
| 1 | 3.1 | 0.12 | — | — | — | — | — | — |
| 2 | 50.9 | 0.66 | 3 | 20 | 200 | 1.7 | 8.5 | 5 |
| 3 | 59.2 | 0.76 | 3 | 40 | 200 | 1.7 | 8.5 | 2 |
| 4 | 46.2 | 1.19 | 3 | 40 | 200 | 1.7 | 8.5 | 2 |
| 5 | 52.8 | 0.68 | 3 | 40 | 500 | 4.25 | 8.5 | 1 |
| 6 | 75.1 | 0.97 | 3 | 40 | 500 | 4.25 | 8.5 | 2 |
| 7 | 115.9 | 1.50 | 3 | 80 | 500 | 4.25 | 8.5 | 5 |

By "x % power" is meant that the power of the laser light is reduced to x % compared to the total power of the laser. A reduction of the power may be obtained in a number of different manners, e.g. by using a filter. Normally, the power out of the laser will be around 25 pJ.

As seen in table 1, the highest sorbed quantity per area seems to be obtained using a high power 3 ps laser and raster scanning the area multiple times (measurement 7). Compared with a non-laser ablated getter showering a total sorbed quantity of 3.1 mbar-$cm^3$ (measurement 1), using laser ablation to activate the getter may easily increase the total sorbed quantity to 115.9 mbar-$cm^3$ (measurement 7), i.e. an increase of more than a factor 35.

Variation of the speed by which the laser spot size is moved over the getter, and the frequency of the laser influences the sorbed quantity. The so-called fluence of a laser pulses is normally defined as optical energy delivered per unit area. When increasing the frequency of the laser, the optical energy delivered per area is increased. Contrary, when increasing the speed, the laser spot moves faster over the getter surface, and the optical energy delivered per area is decreased. By increasing both the speed and the frequency with the same factor, the fluency can be kept the same if the other laser parameters are keep the same. This is seen in table 1 by comparing the results of measurement 2 and 3 with that of measurement 6, which shows a similar sorbed quantity per area when the speed increased from 1.7 to 4.25, i.e. by a factor of 2.5, and the frequency of the laser is increased from 200 Hz to 500 Hz, i.e. also by a factor of 2.5.

Recent experiments have shown even higher sorbed quantities of approximately 2.5 mbar-$cm^3/cm^2$ when reducing the power to 40% and the speed of the laser spot to 1.7 m/s, while including only 2 iterations. This will require a laser ablation of 2.4 $cm^2$ of metal in order to obtain a total getter capacity of 6 mbar-$cm^3$. For example, a very slim getter being only 1.1 mm wide needs only to have a length of 24.1 cm to obtain a total getter capacity of 6 mbar-$cm^3$, when including also room for deviations in laser spot accuracy of 0.1 mm. By increasing the size of the getter further, e.g. by making it even longer, an even more effective total getter sorbed quantity can be obtained, as the area is increased.

The pressure in the sealed cavity 8 between the two glass panes 10, 20 will normally be no higher than 0.001 mbar, such as no higher than 0.0005 mbar, or such as higher than 0.0001 mbar. When the metal-based getter 30 is activated by laser ablation, the pressure in the sealed cavity 8 between the two glass panes 10, 20 will normally be reduced. The pressure may be reduced with a factor 100 after activation of the getter.

Tables 2 and 3 show the measurement of the pressure inside a VIG unit comprising a getter before the getter is activated by laser ablating and afterwards as time progresses. Over time, the VIG unit is also subjected to UVB light to mimic a real life situation where the VIG unit is used in a window. The VI unit has the dimension 0.4 m×0.6 m and it comprises a single silver low emissivity coating layer.

The pressure decrease inside the VIG unit is measured using Spinning roller gauge pressure measurement. Different means for measuring the pressure such as a roto meter, a flow meter, an ordered a mass spec type flow control meters, may be used.

In table 2, the getter is a 25×25 mm titanium foil getter. The laser used for laser ablating the getter is a 3 ps, 100 K, 40% power laser, which is raster scanned at a speed of 5 m/s and with a hatch of 3.3 μm.

TABLE 2

Titanium foil getter

| Date | Accumulated UV | Pressure (mbar) | Laser ablation |
|---|---|---|---|
| 24 Jan. 2019 | 0 | $2.06 \cdot 10^{-3}$ | |
| 29 Jan. 2019 | 0 | $1.95 \cdot 10^{-3}$ | |
| 1 Feb. 2019 | 0 | $7.20 \cdot 10^{-5}$ | X |
| 5 Feb. 2019 | 0 | $7.08 \cdot 10^{-5}$ | |
| 25 Feb. 2019 | 500 | $1.90 \cdot 10^{-5}$ | |
| 19 Mar. 2019 | 1000 | $1.37 \cdot 10^{-5}$ | |
| 20 Mar. 2019 | 1000 | $2.40 \cdot 10^{-5}$ | |
| 9 Apr. 2019 | 1500 | $2.40 \cdot 10^{-5}$ | |
| 30 Apr. 2019 | 2000 | $2.11 \cdot 10^{-5}$ | |
| 20 May 2019 | 2500 | $2.46 \cdot 10^{-5}$ | |

In table 3, the getter is a 25×25 mm zirconium foil getter. The laser used for laser ablating the getter is a 150 ps, 200 kHz, 10% power laser, which is raster scanned at a speed of 5.6 m/s and with a hatch of 2.2 μm. Thus, longer pulses, but longer power is used in the experiments shown in table 3 compared to table 2.

TABLE 3

Zirconium foil getter

| Date | Accumulated UV | Pressure (mbar) | Laser ablation |
|---|---|---|---|
| 14 Jan. 2019 | 0 | $2.32 \cdot 10^{-3}$ | |
| 21 Jan. 2019 | 0 | $2.36 \cdot 10^{-3}$ | |
| 28 Jan. 2019 | 0 | $3.36 \cdot 10^{-3}$ | |
| 1 Feb. 2019 | 0 | $3.90 \cdot 10^{-5}$ | X |
| 5 Feb. 2019 | 0 | $3.60 \cdot 10^{-5}$ | |
| 25 Feb. 2019 | 500 | $2.30 \cdot 10^{-5}$ | |
| 19 Mar. 2019 | 1000 | $1.80 \cdot 10^{-5}$ | |
| 20 Mar. 2019 | 1000 | $2.80 \cdot 10^{-5}$ | |
| 9 Apr. 2019 | 1500 | $2.70 \cdot 10^{-5}$ | |
| 30 Apr. 2019 | 2000 | $2.85 \cdot 10^{-5}$ | |
| 20 May 2019 | 2500 | $2.87 \cdot 10^{-5}$ | |

As clearly seen in both table 2 and 3, the pressure drops upon laser ablation by approximately a factor of 100 independently of whether a 3 ps or a 150 ps laser is used. The pressure remains more or less constant over time after laser ablation and subjecting the VIG unit to UV light for both getter material types.

Figure 8A:
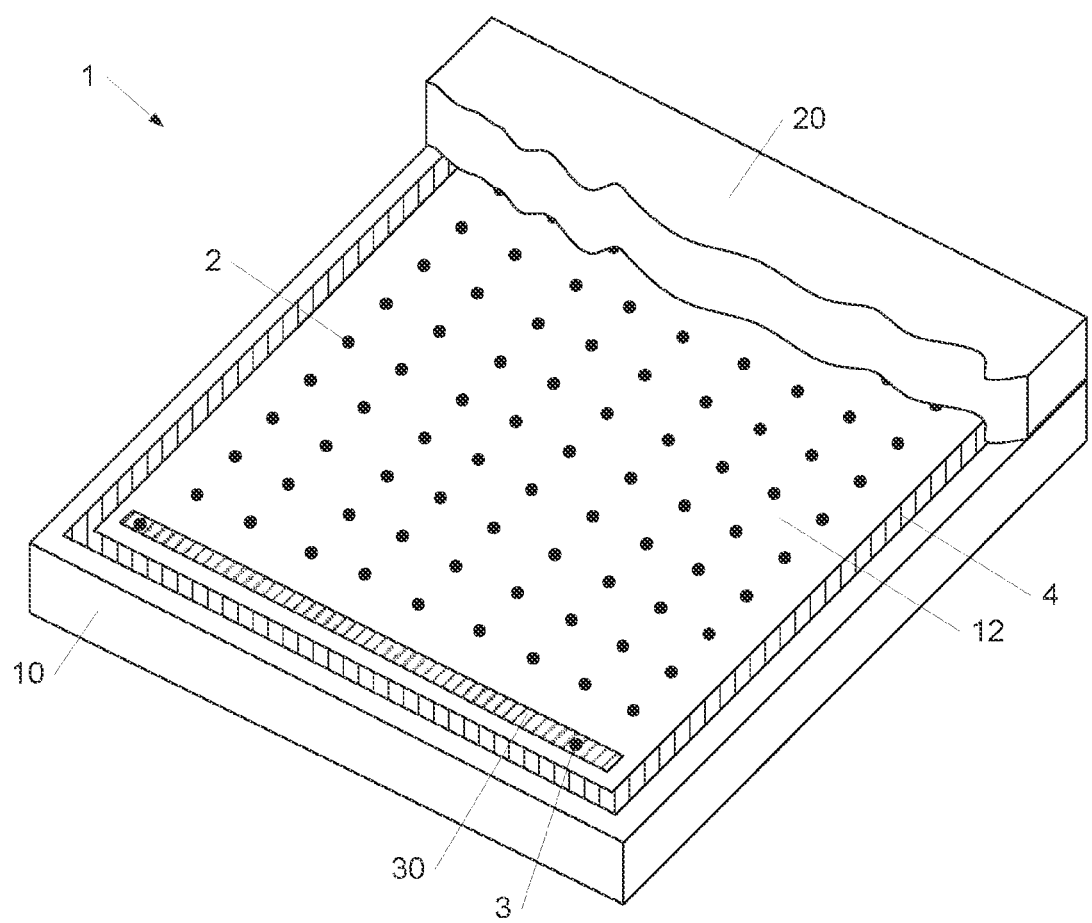
FIGS. 8A-E show a VIG unit, where the getter is fixed in position by a spacer, with FIG. 8A being a perspective view and FIGS. 8B-E being side views with different spacer and glass pane constructions.
Figure 8B:
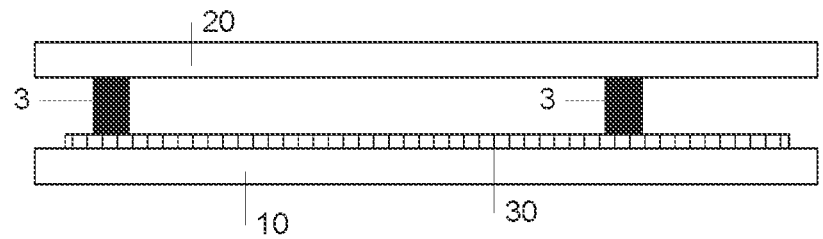
Figure 8C:
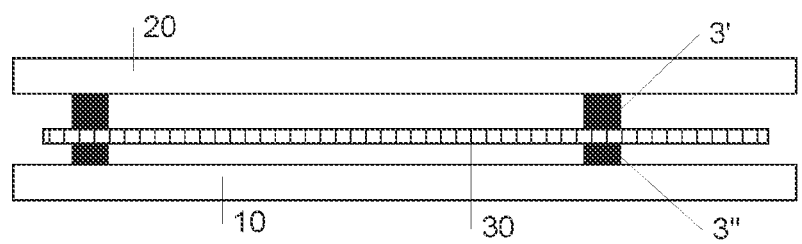

Referring now to FIG. 8A, a VIG unit 1 is shown in a perspective view in the same manner as in FIG. 6A, where part of the second glass pane 20 has been removed in order to provide a better view of the inside of the VIG unit 1. Included in FIG. 8A is also a getter fixating spacer 3, which secures the getter 30 inside the VIG unit 1. FIG. 8B shows a side view of the VIG unit 1 with two getter fixating spacers 3 securing the getter 30. Thus, in one or more examples, the getter 30 is fixed inside the sealed cavity 8 by at least one getter fixation member 3. The at least one getter fixation member 3 may be different from the number of spacers 2. Alternatively, the at least one getter fixation member is a spacer. By different is included a difference in height, thickness, material, and similar.

As an alternative to using a getter strip, a number of the spacers 2 may have a function as getters.

A two two-part getter fixation member 3', 3" may also be used, where the getter 30 is positioned between a first part 3' and a second part 3" of the getter fixation member 3 as illustrated in figure SC. This example results in the at least one getter fixation member 3 being positioned between the getter 30 and the inner surface 22 of the second glass pane 20, and in the at least one getter fixation member 3 also being positioned between the getter 30 and the inner surface 12 of the first glass pane 10.

Figure 8D:
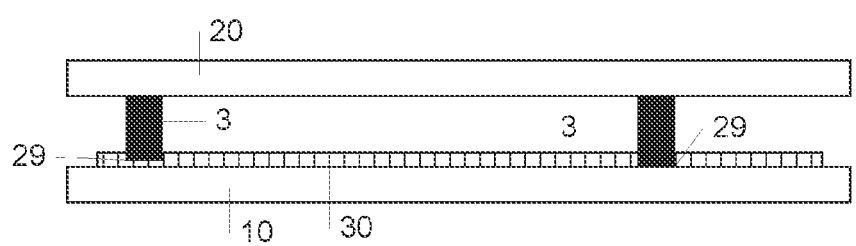

The getter 30 may comprise at least one recess 29 into which the at least one getter fixation member 3 is positioned. As shown in FIG. 8D, the recess 29 may extend all the way through the getter 30 as shown at the right hand side of FIG. 8I) and only partly through the getter 30 as shown at the left hand side of FIG. 8D.

Figure 8E:
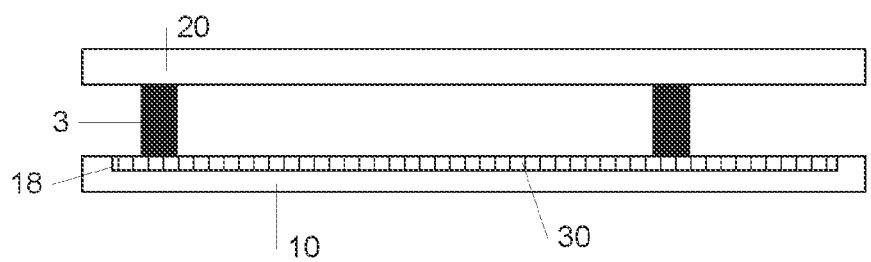

In FIG. 8E is shown an example, where the inner surface 12 of the first glass pane 10 has a getter indentation 18 into which the getter 30 is positioned.

What is claimed:

1. A vacuum insulated glazing unit comprising:
   a first glass pane and a second glass pane with inner surfaces opposing each other;
   a side seal material positioned between edges of the glass panes thereby forming a sealed cavity having a cavity pressure between the first glass pane and the second glass pane;
   a number of spacers positioned between the first glass pane and the second glass pane inside the sealed cavity; and
   at least one getter positioned inside the sealed cavity,
   wherein the getter has a top surface having a structured portion and non-structured portion,
   wherein the structured portion is formed via laser ablation and comprises a plurality of depressions, wherein adjacent depressions are spaced apart at a depression distance of at most 25 μm; and
   wherein the getter is formed of a metal material.

2. The vacuum insulated glazing unit according to claim 1, wherein the getter is fixed inside the sealed cavity by at least one getter fixation member, and wherein the at least one getter fixation member is a spacer.

3. The vacuum insulated glazing unit according to claim 1, wherein the depression distance is at the most 20 μm.

4. The vacuum insulated glazing unit according to claim 1, wherein the depressions have an elongated shape.

5. The vacuum insulated glazing unit according to claim 1, wherein the getter is in the shape of an elongated strip or a square.

6. The vacuum insulated glazing unit according to claim 1, wherein a multiple of getters are positioned inside the sealed cavity.

7. The vacuum insulated glazing unit according to claim 1, wherein the getter is positioned at a distance from an inner edge of the side seal material of at the most 15 mm.

8. The vacuum insulated glazing unit according to claim 1, wherein the getter is positioned at a distance from the edge of the first glass pane of at the most 40 mm.

9. The vacuum insulated glazing unit according to claim 1, wherein the getter is a metal-based getter, wherein the one or more metals is titanium, aluminum, zirconium, chromium, vanadium, or alloys thereof.

10. The vacuum insulated glazing unit according to claim 9, wherein the metal-based getter comprises one or more metals selected from group IV elements.

11. The vacuum insulated glazing unit according to claim 1, wherein the getter has a length L, a width W, and an average thickness T, wherein L is at least twice of W.

12. The vacuum insulated glazing unit according to claim 11, wherein the thickness T is 0.100 mm or less.

13. The vacuum insulated glazing unit according to claim 11, wherein the thickness T is in the range of 0.020-0.300 mm.

14. The vacuum insulated glazing unit according to claim 11, wherein the width W is in the range of 0.5-10 mm.

15. The vacuum insulated glazing unit according to claim 1, wherein the getter is positioned parallel to at least one of:

a first edge of the first glass pane; and/or
a second edge of the first glass pane; and/or
a third edge of the first glass pane, and/or
a fourth edge of the first glass pane,
wherein the first edge and the third edge are opposing each other, and the second edge and the fourth edge are opposing each other.

16. The vacuum insulated glazing unit according to claim 1, wherein the surface of the at least one getter comprises a pattern in the form of a code or a logo.

17. The vacuum insulated glazing unit according to claim 16, wherein the pattern is obtained by laser ablation with a pulsed laser emitting pulses with a pulse length of 500 picosecond or shorter.

18. A window comprising a vacuum insulated glazing unit according to claim 1.

* * * * *